(12) United States Patent
Berry et al.

(10) Patent No.: US 11,027,372 B2
(45) Date of Patent: Jun. 8, 2021

(54) CONTROLLING PERFORATING OF AN ACOUSTIC PANEL BASED ON SENSED OPTICAL EMISSIONS

(71) Applicant: Rohr, Inc., Chula Vista, CA (US)

(72) Inventors: Jacquelyn Berry, Corona, CA (US); Song Chiou, Irvine, CA (US)

(73) Assignee: Rohr, Inc., Chula Vista, CA (US)

( * ) Notice: Subject to any disclaimer, the term of this patent is extended or adjusted under 35 U.S.C. 154(b) by 328 days.

(21) Appl. No.: 15/866,592

(22) Filed: Jan. 10, 2018

(65) Prior Publication Data

US 2019/0210157 A1 Jul. 11, 2019

(51) Int. Cl.
*B23K 26/70* (2014.01)
*B23K 26/352* (2014.01)
*B23K 26/03* (2006.01)
*B23K 26/382* (2014.01)
*B64C 1/40* (2006.01)
*B23K 103/16* (2006.01)
*B23K 101/02* (2006.01)

(52) U.S. Cl.
CPC .......... *B23K 26/705* (2015.10); *B23K 26/032* (2013.01); *B23K 26/352* (2015.10); *B23K 26/382* (2015.10); *B23K 2101/02* (2018.08); *B23K 2103/16* (2018.08); *B64C 1/40* (2013.01)

(58) Field of Classification Search
CPC .. B23K 26/705; B23K 26/352; B23K 26/382; B23K 26/032; B23K 2103/16; B23K 2101/02; B64C 1/40

USPC ..................................................... 219/121.62
See application file for complete search history.

(56) References Cited

U.S. PATENT DOCUMENTS

| 6,827,180 B2 | 12/2004 | Wilson |
| 8,959,768 B2 | 2/2015 | Vauchel et al. |
| 9,604,438 B2 * | 3/2017 | Lumbab et al. ..... G10K 11/161 |
| 2011/0100967 A1 | 5/2011 | Yoo et al. |
| 2012/0000893 A1 | 1/2012 | Broude et al. |
| 2016/0136760 A1 | 5/2016 | Tiwari et al. |

FOREIGN PATENT DOCUMENTS

| GB | 2404966 A | 2/2005 |
| GB | 2486120 A | 6/2012 |

OTHER PUBLICATIONS

EP search report for EP19150845.6 dated Jul. 5, 2019.

* cited by examiner

*Primary Examiner* — Tuan N Nguyen
(74) *Attorney, Agent, or Firm* — Getz Balich LLC (57) ABSTRACT

A manufacturing process is provided that includes steps of: providing a panel comprising a core connected to a first skin, wherein the panel is configured with a plurality of cavities extending through the core to the first skin; partially forming a first perforation in the first skin using a laser beam; operating a sensor to sense optical emissions produced during the partial forming of the first perforation; and determining, based on an output of the sensor, whether to: continue formation of the first perforation in the first skin; or terminate formation of the first perforation in the first skin.

20 Claims, 8 Drawing Sheets

CONTROLLING PERFORATING OF AN ACOUSTIC PANEL BASED ON SENSED OPTICAL EMISSIONS

BACKGROUND

1. Technical Field

This disclosure relates generally to laser machining, and, more particularly, to forming one or more perforations in a first skin of an acoustic panel with a laser.

2. Background Information

An acoustic panel may include a cellular core between a first skin and a second skin. The core is typically bonded to the first skin with structural adhesive bonding material at joints between core walls and the first skin. Similarly, the core is typically bonded to the second skin with structural adhesive bonding material at joints between the core walls and the second skin.

After bonding the skins and the core together, the first skin may be perforated to form passageways for sound waves to enter acoustic chambers inside of the panel defined by the core, the first skin, and the second skin. These perforations may be formed in the first skin using traditional techniques such as mechanical drilling or grit ablation with masking. The perforations may alternatively be formed in the first skin using laser machining. U.S. Patent Application Publication No. US20160136760A1, published May 19, 2016, discusses laser machining perforations in an acoustic panel. During such laser perforation, perforations may be formed in the first skin which also cuts or otherwise alters the core walls of the cellular core, or cuts or otherwise alters the adhesive bonding connection of the core walls to the first skin. This will occur when the perforation being formed is aligned with or close to one of the underlying core walls. As a result, the core walls and/or the bond between the core walls and the first skin may be damaged and weakened. This may not be a problem in certain applications. In other applications, however, the weakening of the core and adhesive bonds may undesirably degrade the structural load carrying capability of the acoustic panel.

There is a need in the art for processes and systems capable of reducing damage to an acoustic panel from laser machining the perforations.

SUMMARY OF THE DISCLOSURE

According to an aspect of the present disclosure, a manufacturing process is provided that includes: (A) providing a panel comprising a core connected to a first skin, wherein the panel is configured with a plurality of cavities extending through the core to the first skin; (B) partially forming a first perforation in the first skin using a laser beam; (C) operating a sensor to sense optical emissions produced during the partial forming of the first perforation; and (D) determining, based on an output of the sensor, whether to: (I) continue formation of the first perforation in the first skin; or (II) terminate formation of the first perforation in the first skin.

According to another aspect of the present disclosure, a manufacturing process is provided for an acoustic panel. This manufacturing process includes: (A) providing a panel comprising a first skin and a plurality of core walls attached to a second side of the first skin; and (B) perforating the first skin using a laser system. The perforating includes: (I) beginning formation of a first perforation in the first skin using the laser system; (II) operating a sensor to sense optical emissions generated during the formation of the first perforation; and (UI) performing a first operation based on an output of the sensor to determine whether to continue the formation of the first perforation or terminate the formation of the first perforation.

The optical emissions may be plasma emissions.

The first skin may be configured from or otherwise include a fiber reinforced polymer. In addition or alternatively, at least one of the walls may be configured from or otherwise include metal.

The first operation may include sensing the output of the sensor to detect that a laser is striking an adhesive bead formed between and attaching together the first skin and one of the core walls and then in response terminating the formation of the first perforation in the first skin.

The step of perforating may also include: (A) initiating formation of a second perforation in the first skin using the laser system; (B) sensing plasma emissions generated during the formation of the second perforation; and (C) stopping the formation of the second perforation in the first skin without completely forming the second perforation in the first skin where the sensed plasma emissions are indicative of material, which is different than the first skin material, being ablated by the laser beam during the formation of the second perforation, and otherwise completing the formation of the second perforation in the first skin.

The determining may include determining to terminate the formation of the first perforation in the first skin where the output is indicative of material ablated by the laser beam at a connection between the first skin and the core.

The determining may include determining to continue the formation of the first perforation in the first skin where the output is not indicative of material ablated by the laser beam at a connection between the first skin and the core.

The core may include a wall between an adjacent pair of the cavities. The wall may be connected to the first skin at the connection.

The core may be configured from or otherwise include core material. The first skin may be configured from or otherwise include first skin material that is different from the core material. The determining may include determining to terminate the formation of the first perforation in the first skin where the output is indicative of ablation of the core material by the laser beam. The determining may also or alternatively include determining to continue the formation of the first perforation in the first skin where the output is not indicative of ablation of the core material by the laser beam. The determining may still also or alternatively include determining to continue the formation of the first perforation in the first skin where the output is only indicative of ablation of the first skin material by the laser beam.

The first skin may be bonded to the core by structural adhesive bonding material. The first skin may be configured from or otherwise include first skin material that is different from the structural adhesive bonding material. The determining may include determining to terminate the formation of the first perforation in the first skin where the output is indicative of ablation of the structural adhesive bonding material by the laser beam. The determining may also or alternatively include determining to continue the formation of the first perforation in the first skin where the output is not indicative of ablation of the structural adhesive bonding material by the laser beam. The determining may still also or alternatively include determining to continue the formation of the first perforation in the first skin where the output is only indicative of ablation of the first skin material by the laser beam.

The panel may also include a second skin. The core may be between and may be connected to the first skin and the second skin.

The process may also include a step of forming an acoustic panel for an aircraft. The forming of the acoustic panel may include the providing of the panel; the partially forming of the first perforation; the sensing of the plasma emissions; and the determining of whether to continue or terminate the formation of the first perforation.

The first operation may be or otherwise include sensing the output of the sensor to detect that a laser is striking one of the core walls and then in response terminating the formation of the first perforation in the first skin.

The foregoing features and the operation of the invention will become more apparent in light of the following description and the accompanying drawings.

BRIEF DESCRIPTION OF THE DRAWINGS

FIGS. 9-12B are sectional illustrations of portions of a first skin, which illustrations depict a sequence of steps performed during formation of a perforation.

DETAILED DESCRIPTION

The present disclosure includes processes and systems for manufacturing an acoustic panel, and in particular an acoustic panel with load carrying capabilities. The acoustic panel may be configured to attenuate noise generated by an aircraft propulsion system such as, for example, a turbofan propulsion system or a turbojet propulsion system. The acoustic panel may be configured to form part of a nacelle of the propulsion system. The acoustic panel may be configured as or form part of an inner or outer barrel, a translating sleeve, a blocker door, etc. Alternatively, the acoustic panel may form part of another component/structure of the aircraft such as its fuselage or a wing. Furthermore, the acoustic panel may be configured to also or alternatively attenuate aircraft related noise other than that generated by the propulsion system. In addition, the acoustic panel of the present disclosure may be configured for non-aircraft applications and/or non-sound suppression applications.

Figure 1:
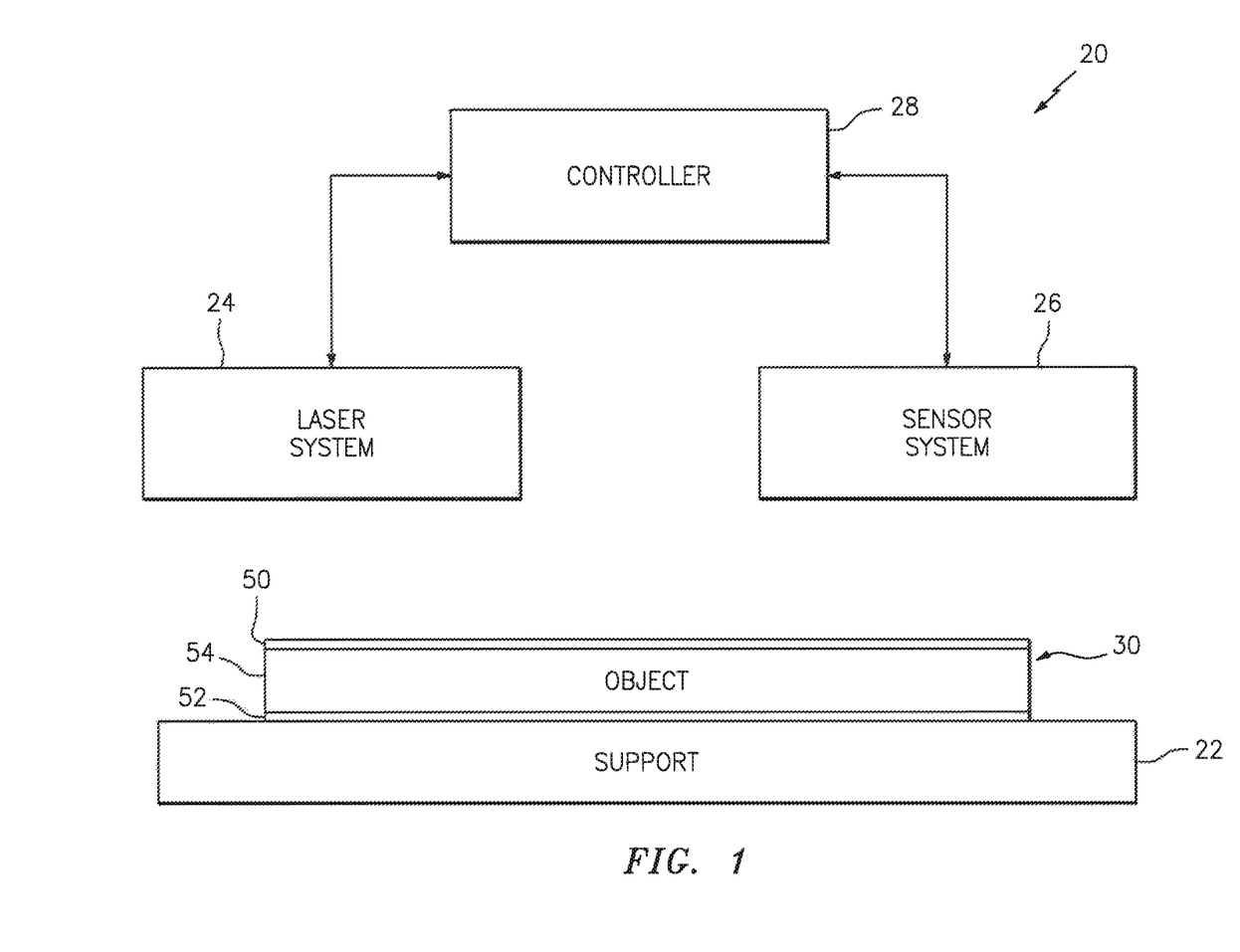
FIG. 1 is a block diagram illustration of a manufacturing system.

FIG. 1 illustrates an exemplary system 20 for manufacturing an acoustic panel. The manufacturing system 20 includes a support 22, a laser system 24 and a sensor system 26 (e.g., an optical sensor system such as, but not limited to, a plasma sensor system). The manufacturing system 20 also includes a controller 28 in signal communication (e.g., hardwired and/or wirelessly coupled) with the laser system 24 and the sensor system 26.

The support 22 is configured to support an object 30; e.g., a preform. Briefly, this object 30 may be a pre-form panel or pre-form bonded panel in the process of becoming an acoustic panel. The support 22 of FIG. 1 may be a table-top, a floor or any other apparatus with a support surface onto which the object 30 may be arranged. The support 22 may also or alternatively include a jig to which the object 30 may be fixedly attached. The object 30, for example, may be mechanically fastened to the jig. The object 30 may also or alternatively be bonded to the jig.

Figure 2:
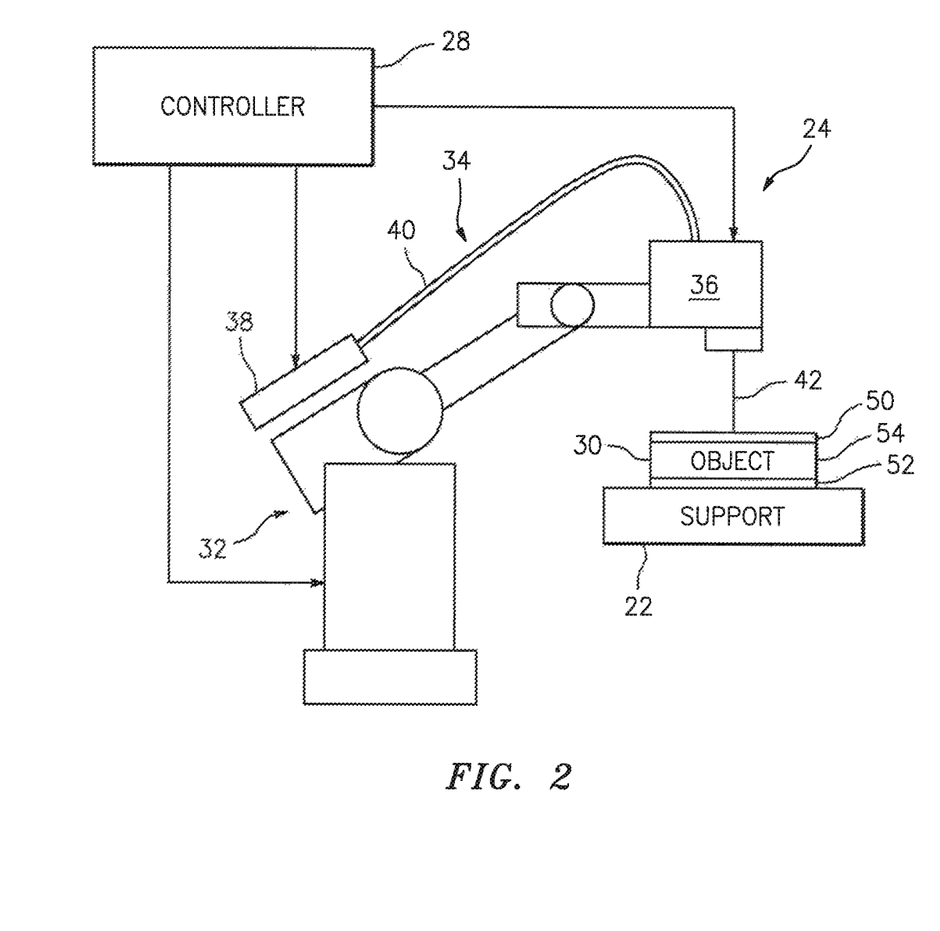
FIG. 2 is a schematic illustration of components of the manufacturing system including a laser system.

FIG. 2 illustrates an exemplary embodiment of the laser system 24. This laser system 24 includes a manipulator 32 and a laser 34. Of course, in other embodiments, the laser system 24 may alternatively be configured without the manipulator 32 where, for example, the support 22 includes or is configured with a manipulator.

The manipulator 32 (e.g., a multi-axis manipulator) is adapted to move at least one component (e.g., a scanner head 36) of the laser 34 to various locations relative to or even within the object 30 in order to direct the laser onto the object for selective and controlled machining. The manipulator 32 of FIG. 2, for example, may be configured as a six-axis robotic arm.

The laser 34 is adapted to form (e.g., cut) one or more perforations (e.g., apertures, through-holes, slits, etc.) in the object 30. The laser 34 may be configured as an infrared (IR) laser and/or other fiber coupling pulsed laser system; e.g., a fiber laser. The laser 34 of FIG. 2, for example, is configured as a fiber coupling pulsed laser. The laser 34 may include a laser beam source 38, a length of optical fiber 40, and the scanner head 36.

The laser beam source 38 is adapted to generate a laser beam 42. The laser beam source 38 may be configured as or otherwise include, for example, a laser diode; e.g., an infrared laser diode.

The optical fiber 40 is adapted to direct the laser beam 42 generated by the laser beam source 38 to the scanner head 36. The optical fiber 40 may be configured as, for example, a length of flexible, hollow optical fiber capable of transmitting the laser beam 42 through reflectance.

The scanner head 36 is adapted to receive the laser beam 42 from the optical fiber 40 and scan the laser beam 42 over at least a portion of the object 30. The term "scan" may describe a process of directing a laser beam along one or more paths over an object and/or to one or more discrete points on the object. The scanner head 36 may also be adapted to change a focal length of the laser beam 42 during and/or before/after the scanning. The term "focal length" may describe a distance between the scanner head 36 and a focal point of the laser beam 42, which is the focal point being where the laser beam 42 converges to its smallest diameter and greatest energy density, and is typically where the laser beam 42 hits an object.

Figure 3:
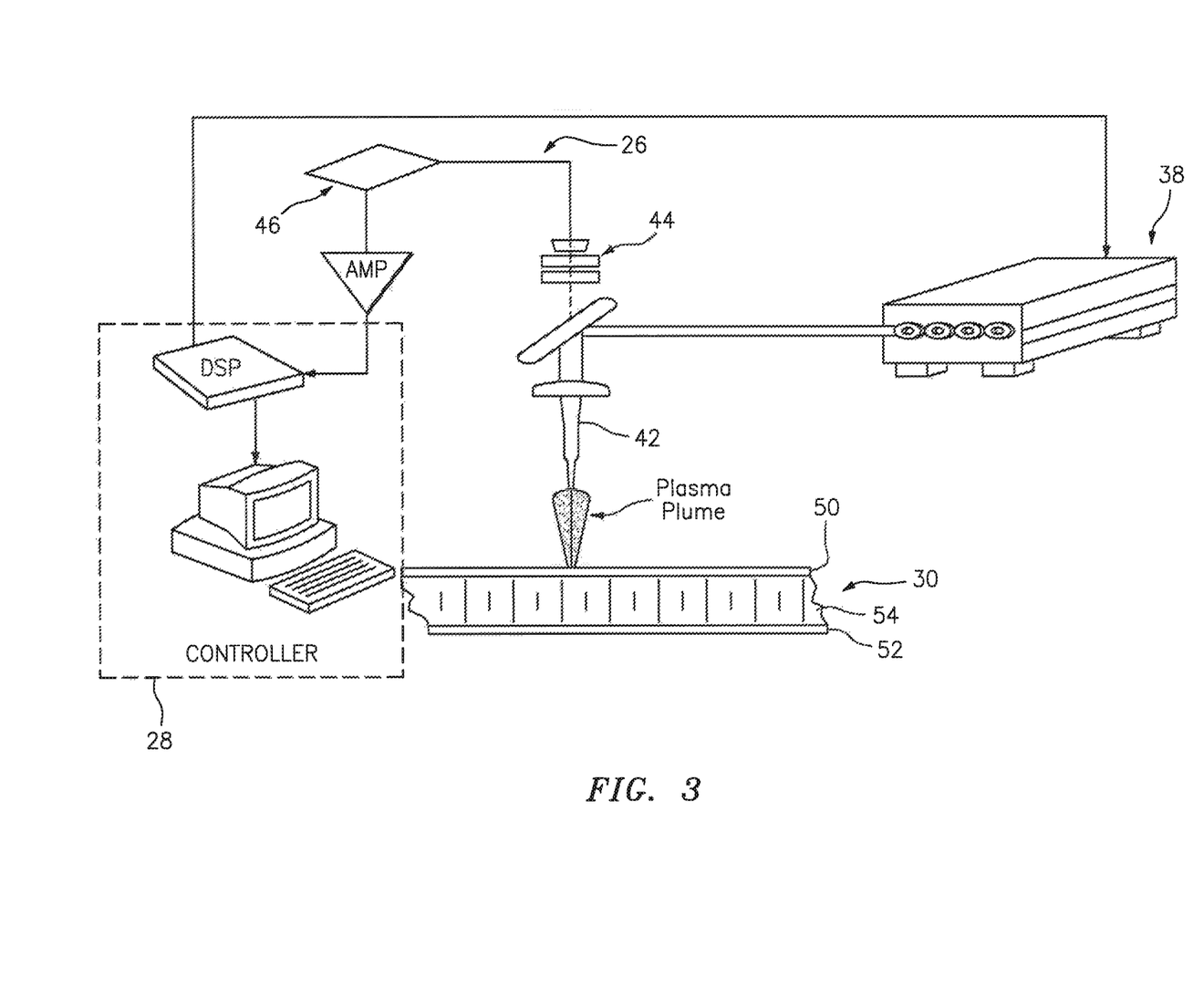
FIG. 3 is a schematic illustration of components of the manufacturing system including a sensor system.

FIG. 3 illustrates an exemplary embodiment of the sensor system 26; e.g., a plasma sensor system. This sensor system 26 may be configured as a Laser Induced Breakdown Spectroscopy (LIBS) system. The sensor system 26 of FIG. 3, for example, is configured to sense plasma emissions produced by laser ablation of object material which may include honeycomb core and structural adhesive.

The inventors have realized that when the laser ablates metallic materials, it creates a plasma because of the way in which the laser interacts with the metal. The plasma emits optical energy. The presence of a plasma can be detected as an indicator that the laser is striking a metal, and possibly even the type of metal can be determined or distinguished based on the characteristics of the optical emissions from the plasma.

The sensor system 26 of FIG. 3 includes an optical bandpass filter 44 and a sensor such as a detector 46; e.g., an amplified detector. The optical bandpass filter 44 is configured to filter out, from the plasma (e.g., a plasma reflection), substantially all emissions except those that are of interest. For example, the optical bandpass filter 44 can filter out emissions indicative of any material other than the honeycomb core and structural adhesive through different wavelengths. The optical bandpass filter 44 may thereby be configured to only pass on the unfiltered, remaining ranges of wavelengths from the honeycomb core and structural adhesive to the detector 46. The detector 46 may be an optical or electronic detector such as, but not limited to, a charged-coupled device (CCD). However, various other types of detectors are known in the art and the present disclosure is not limited to any particular types or configurations thereof.

Referring to FIG. 1, the controller 28 (e.g., a processing system) is adapted to signal one or more other system 20 components to perform at least a portion of the process described below. The controller 28 may be implemented with a combination of hardware and software. The hardware may include memory and one or more single-core and/or multi-core processors; e.g., a digital signal processor (DSP). The memory may be a non-transitory computer readable medium, and adapted to store the software (e.g., program instructions) for execution by the processors. The hardware may also include analog and/or digital circuitry other than that described above.

Figure 4:
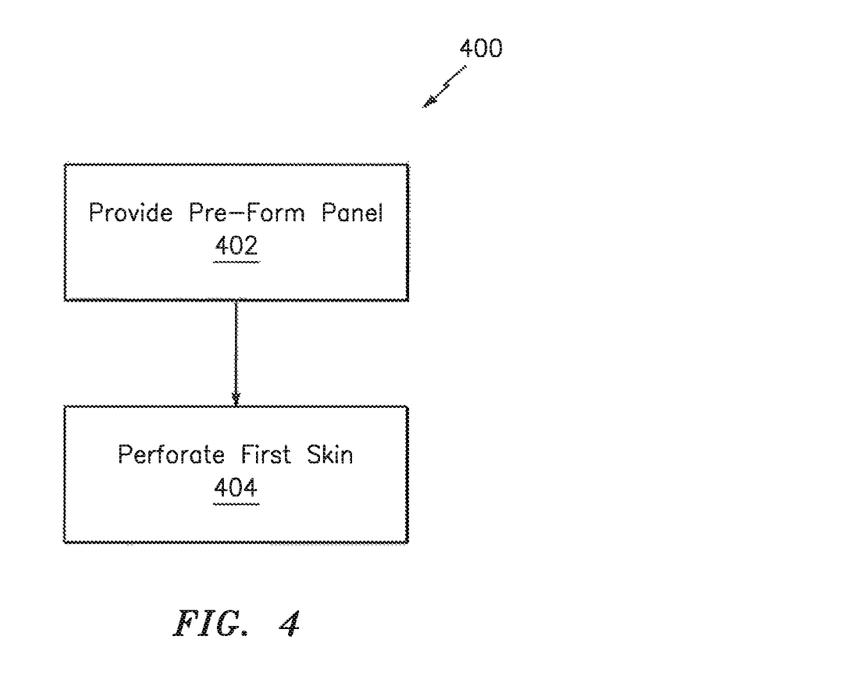
FIG. 4 is a flow diagram of an exemplary process for manufacturing an acoustic panel.

FIG. 4 is a flow diagram of an exemplary process 400 for manufacturing an acoustic panel such as, but not limited to, a sound attenuating acoustic panel as described above. This manufacturing process 400 may be implemented using a manufacturing system such as, but not limited to, the manufacturing system 20 of FIG. 1.

Figure 5:
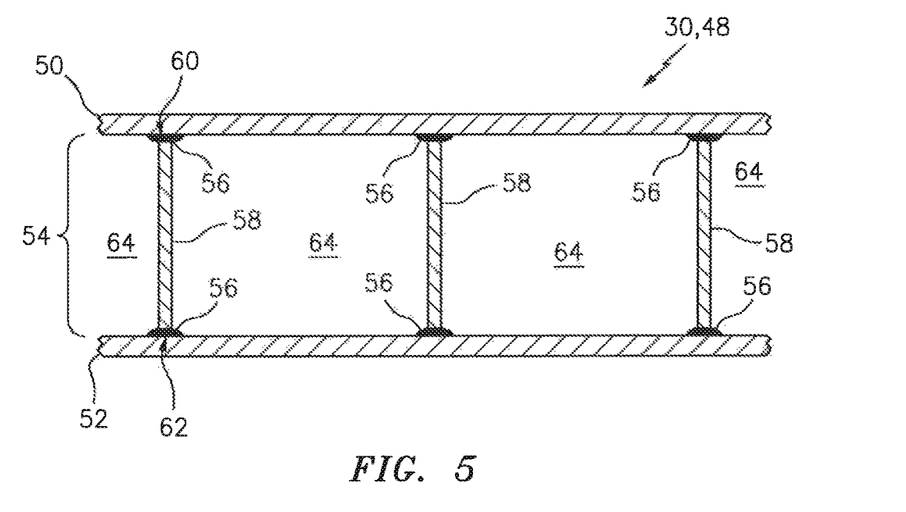
FIG. 5 is a sectional illustration of a portion of an exemplary pre-form panel.

In step 402, a pre-form panel 48 (e.g., the object 30) is provided. An exemplary embodiment of the pre-form panel 48 is illustrated in FIG. 5. This pre-form panel 48 includes a first skin 50, a second skin 52 and a cellular core 54 (e.g., a honeycomb core, etc.) arranged between the first skin 50 and the second skin 52. The cellular core 54 includes walls 58 connected to the first skin 50 and the second skin 52. The walls 58 may be bonded to the first skin 50 and the second skin 52 by structural adhesive bonding material 56; e.g., polymeric adhesive (e.g., a thermoplastic or thermoset epoxy). In order to assist in detecting when the laser is striking the adhesive bonding material 56, the material 56 may be doped with one or more fillers such as metal (e.g., aluminum (Al), titanium (Ti), etc.) powder which produce a plasma when struck by the laser. Walls 58 are bonded to the first skin 50 at a first skin-to-wall interface 60 (e.g., a joint/connection) via a quantity (e.g., a bead) of the structural adhesive bonding material 56. Each of the walls 58 is also bonded to the second skin 52 at a second skin-to-wall interface 62 (e.g., a joint/connection) via another quantity (e.g., a bead) of the structural adhesive bonding material 56.

The pre-form panel 48 is also configured with one or more internal cavities 64/chambers. Each of these cavities 64 extends through the core 54 to and between the first skin 50 and the second skin 52. Each of the cavities 64 also extends laterally within the core 54 between a respective adjacent pair of the walls 58. In this pre-form panel 48 configuration, the cavities 64 are generally sealed cavities as the first skin 50 and the second skin 52 are configured as solid, non-porous (e.g., non-perforated) sheets of material.

The first skin 50 is constructed from first skin material. The second skin 52 is constructed from second skin material. The core 54 is constructed from core material. The first skin material may be the same as the second skin material, but different from the core material and the structural adhesive bonding material 56. For example, the first skin material and the second skin material may each be composite material such as, but not limited to, fiber-reinforced composite material. An example of such fiber-reinforced composite material is fiber reinforcement with a polymeric matrix; e.g., a thermoplastic or thermoset epoxy. Examples of fiber-reinforcement include, but are not limited to, fiberglass, carbon fiber, aramid (e.g., Kevlar®) fibers and/or a mixture thereof. The core material, by contrast, may be metal such as, but not limited to, aluminum (Al) or an aluminum alloy, or titanium (Ti) or titanium alloy. As described above, the structural adhesive bonding material 56 may be polymeric adhesive with at least metal (e.g., Al, Ti, etc.) powder filler. Of course, various other types of skin, core and structural adhesive bonding materials are known in the art and the present disclosure is not limited to any particular ones thereof as along as at least the core material and ideally the structural adhesive bonding material 56 includes at least one material component that is not included in the first skin material.

Figure 6:
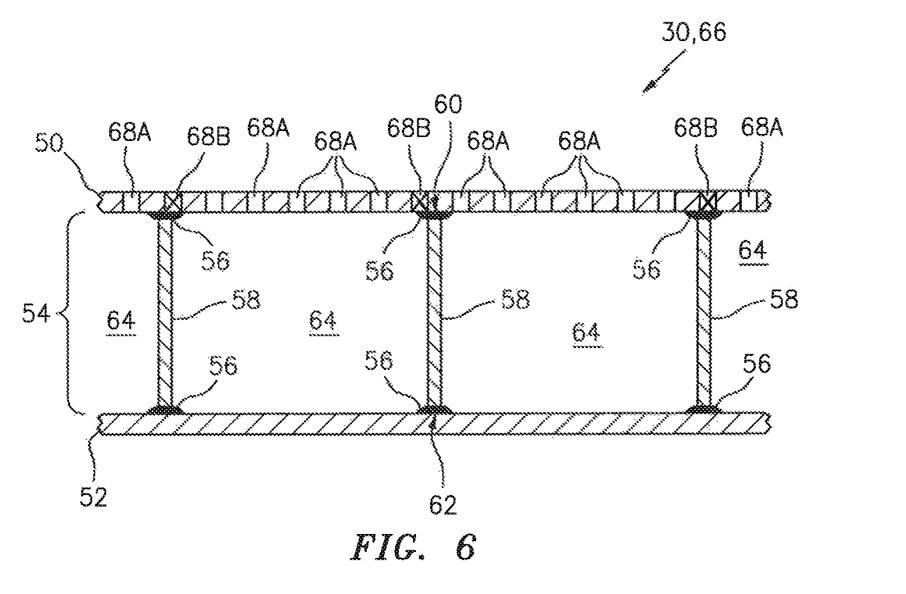
FIG. 6 is a sectional illustration of a portion of an exemplary acoustic panel.

In step 404, the first skin 50 is perforated in order to convert the preform into an acoustic panel. An exemplary embodiment of such an acoustic panel 66 is illustrated in FIG. 6. This acoustic panel 66 is formed from and, thus, is similar to the pre-form panel 48 of FIG. 5. However, whereas the first skin 50 of the pre-form panel 48 is non-porous, the first skin 50 of the acoustic panel 66 is porous (e.g., perforated) and, more particularly, includes a plurality of perforations 68A; e.g., apertures, through-holes, slits, angled holes, etc. Each of these perforations 68A extends vertically through the first skin 50 and is fluidly coupled with a respective one of the cavities 64. Thus, each of the cavities 64 is fluidly coupled with an exterior environment of the acoustic panel 66, adjacent the first skin 50, through one or more of the perforations 68A. The perforations 68A should ideally pass through the first skin 50, but not penetrate or impact the walls 58 or the bonding beads 56. As a result, each of the perforations 68A may only be aligned with (e.g., laterally overlap) a respective cavity 64.

The acoustic panel 66 of FIG. 6 also includes one or more partially formed perforations 68B; e.g., incomplete perforations. These partially formed perforations 68B are schematically shown in. FIG. 6 and represented with an "X" therein. In general, each of the partially formed perforations 68B is partially or completely aligned with (e.g., laterally overlaps) at least one wall 58 of the core 54 and, thus, at least one first skin-to-wall interface 60. The perforations 68B are term "partially formed" because steps of forming those partially formed perforations 68B are terminated before completion as described below in further detail.

Figure 7:
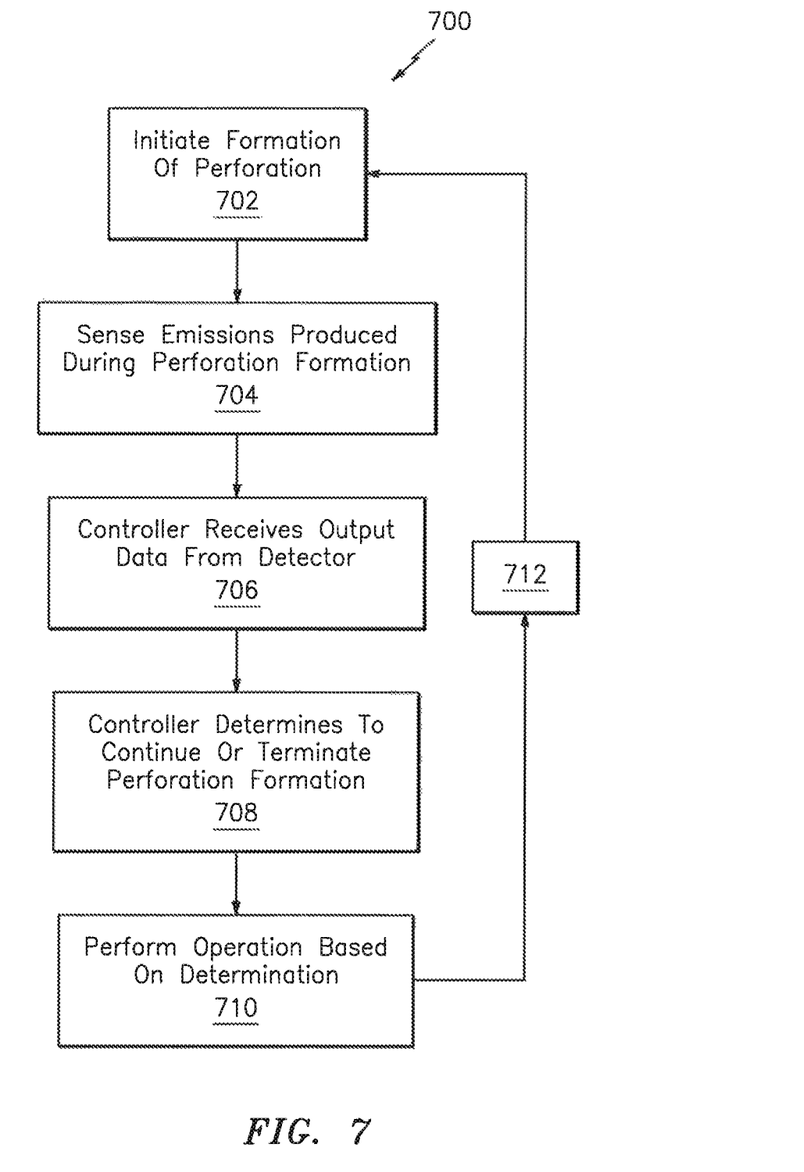
FIG. 7 is a flow diagram of an exemplary process for performing a perforation step for the process of FIG. 4.
Figure 8:
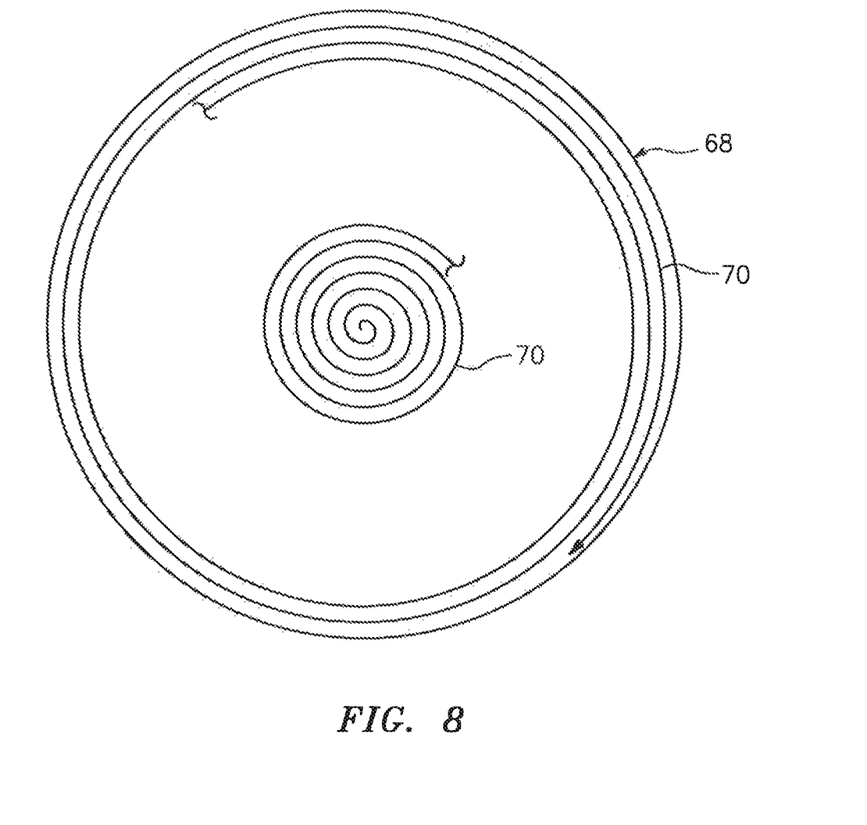
FIG. 8 is a schematic illustration of an example of one of the possible trajectories of a laser beam during formation of a perforation.

FIG. 7 is a flow diagram of a process 700 for performing the perforation step 404 of FIG. 4. In step 702, formation of a respective perforation is initiated/started. During this perforation formation, the laser system 24 directs a laser beam 42 onto the first skin 50 of the pre-form panel 48 at a selected perforation location. The laser beam 42 ablates the first skin material and thereby begins to form the perforation 68A, 68B (generally referred to as "68") in the first skin 50. This may be accomplished in any suitable way. For example, to form very small perforations, the laser may scan across the entire cross-section of the perforation so the laser can completely ablate successive layers of the first skin to form the perforation. Alternatively, the laser may scan around the perimeter of the perforation to be formed in a process called tre-panning, to cut the material away from the first skin in a slug form to form the perforation. Other suitable drilling methods are possible for the laser.

Figure 9:
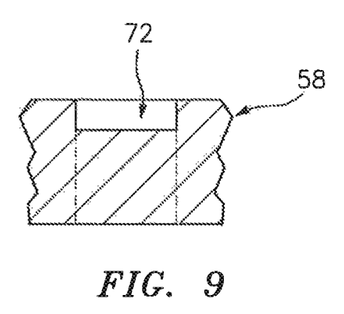
Figure 10:
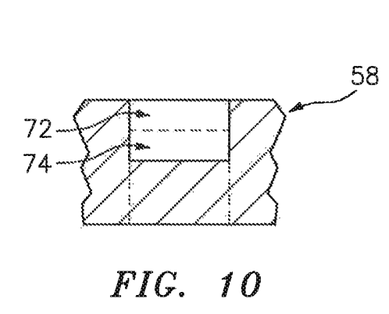
Figure 11:
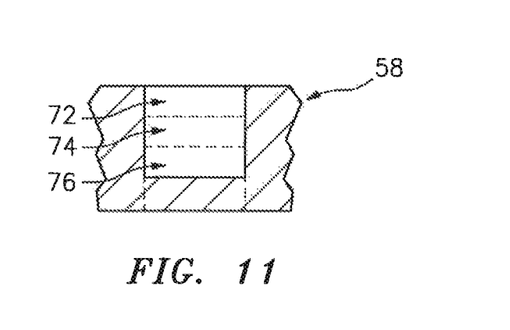
Figure 12A:
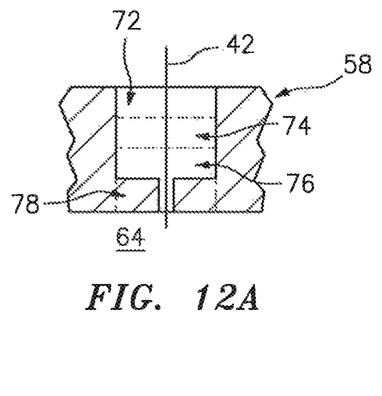
Figure 12B:
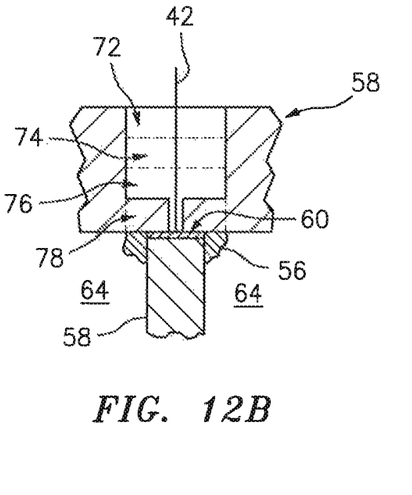

Ideally, the laser machining occurs one layer at a time as illustrated in FIGS. 9-11. A first layer of the perforation is removed in FIG. 9, and a second and a third in subsequent operations as illustrated in FIGS. 10 and 11. During the laser machining process, the laser beam 42 begins to pass completely through the first skin 50. In FIG. 12A, the laser beam 42 passes through the first skin 50 and projects into a respective one of the cavities 64. By contrast, in FIG. 12B, the laser beam 42 passes through the first skin 50 and projects onto the first skin-to-wall interface 60. As a result, the laser beam 42 may begin to ablate panel material at the first skin-to-wall interface 60. More particularly, in addition to ablating the first skin material, the laser beam 42 may also ablate the structural adhesive bonding material 56 and/or the core wall 58.

To reduce potential of damage to a first skin-to-wall interface 60, the perforation process 700 includes a step 704 of sensing plasma emissions generated during the perforation 68 formation using the plasma sensor system 26. These plasma emissions are a byproduct of the ablation of the panel material by the laser beam 42. For example, when the laser beam 42 ablates the first skin material, plasma emissions are produced with, for example, a first range of wavelengths. When the laser beam 42 ablates the structural adhesive bonding material 56, plasma emissions are produced with, for example, a second range of wavelengths. This second range of wavelengths may be different than the first range of wavelengths where there is a difference in material composition between the first skin material and the structural adhesive bonding material 56. Similarly, when the laser beam 42 ablates the core material, plasma emissions are produced with, for example, a third range of wavelengths. This third range of wavelengths may be different than the first range of wavelengths where there is difference in material composition between the first skin material and the core material.

At least some of the plasma emissions produced during the panel material ablation are sensed using the detector 46. For example, the bandpass filter 44 may be configured to filter out emissions from plasma produced when the laser machines the skin, i.e. filter out emissions within the first range of wavelengths. Thus, the detector 46 will only receive and, thus, sense plasma emissions where the structural adhesive bonding material 56 and/or the core material is ablated by the laser beam 42.

In step 706, the controller 28 receives output data (e.g., an output) from the sensor system 26 and, more particularly, the detector 46. This output data is indicative of plasma emissions sensed by the detector 46 during the formation of the perforation.

In step 708, the controller 28 determines, based on the output data and thus the sensed plasma emissions, whether to: (1) continue (e.g., complete) formation of the perforation 68 initiated during the step 702; or (2) terminate formation of the perforation 68 initiated during the step 702 and, for example, move onto formation of another perforation 68. The controller 28 may determine formation of the perforation 68 should continue where no plasma emissions are sensed by the detector 46; note, the bandpass filter 44 may filter out at least the first range of wavelengths associated with ablation of the first skin material from the light provided to the detector 46. Alternatively, the controller 28 may determine formation of the perforation 68 should continue where the detector 46 does not sense plasma emissions in the second range of wavelengths or the third range of wavelengths. Of course, if the bandpass filter 44 is omitted, the controller 28 may determine formation of the perforation 68 should continue where the detector 46 does not sense plasma emissions in the second or third range of wavelengths and/or only senses plasma emissions in the first range of wavelengths. The controller 28 may determine formation of the perforation 68 should be terminated where the detector 46 senses plasma emissions in the second range of wavelengths and/or the third range of wavelength, or detects the presence of any plasma emissions. The controller 28 may determine formation of the perforation 68 should continue where the detector 46 (e.g., only) senses emissions indicative of the first skin, but stops the formation where those emissions change (e.g., the emissions also are indicative of the core material).

In step 710, an operation is performed by the manufacturing system 20 based on the determination made during the step 708. For example, if the determination is made the perforation 68 formation should continue, then the laser system 24 continues ablate the first layer material with the laser beam 42 until, for example, the respective perforation 68 is completely formed. However, if the determination is made that the perforation 68 formation should terminate, then the laser system 24 will terminate the formation of the respective perforation 68 such that the perforation 68 remains only partially formed as shown, for example, in FIG. 12B. Since the formation is terminated, the first skin-to-wall interface 60 is not further damaged/deteriorated thereby reducing harm to the structural integrity of the panel 66.

In step 712, the steps 702, 704, 706, 708 and 710 are repeated one or more times to form or partially form one or more additional perforations 68 in the first skin 50.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A manufacturing process, comprising:
providing a panel comprising a core connected to a first skin, wherein the panel is configured with a plurality of cavities extending through the core to the first skin;
partially forming a first perforation in the first skin using a laser beam;
operating a sensor to sense optical emissions produced during the partial forming of the first perforation; and
determining, based on an output of the sensor, whether to
continue formation of the first perforation in the first skin; or
terminate formation of the first perforation in the first skin;
wherein the first skin is bonded to the core by a structural adhesive bonding material doped with one or more fillers that produce a plasma when struck by the laser beam;

wherein the first skin comprises first skin material that is different from the structural adhesive bonding material; and wherein the determining comprises determining to terminate the formation of the first perforation in the first skin where the output is indicative of ablation of the structural adhesive bonding material by the laser beam.

2. The manufacturing process of claim 1, wherein the determining further comprises determining to continue the formation of the first perforation in the first skin where the output is not indicative of material ablated by the laser beam at a connection between the first skin and the core.

3. The manufacturing process of claim 1, wherein
the core includes a wall between an adjacent pair of the cavities; and
the wall is connected to the first skin by the structural adhesive bonding material that is doped with the one or more fillers.

4. The manufacturing process of claim 1, wherein
the core comprises core material;
the first skin comprises first skin material that is different from the core material; and
the determining further comprises determining to terminate the formation of the first perforation in the first skin where the output is indicative of ablation of the core material by the laser beam.

5. The manufacturing process of claim 4, wherein the determining further comprises determining to continue the formation of the first perforation in the first skin where the output is not indicative of ablation of the core material by the laser beam.

6. The manufacturing process of claim 4, wherein the determining further comprises determining to continue the formation of the first perforation in the first skin where the output is only indicative of ablation of the first skin material by the laser beam.

7. The manufacturing process of claim 1, wherein the determining comprises determining to continue the formation of the first perforation in the first skin where the output is not indicative of ablation of the structural adhesive bonding material by the laser beam.

8. The manufacturing process of claim 1, wherein the determining comprises determining to continue the formation of the first perforation in the first skin where the output is only indicative of ablation of the first skin material by the laser beam.

9. The manufacturing process of claim 1, wherein the panel further comprises a second skin, and the core is between and connected to the first skin and the second skin.

10. The manufacturing process of claim 1, wherein the structural adhesive bonding material comprises polymeric adhesive doped with the one or more fillers.

11. The manufacturing process of claim 10, wherein the one or more fillers comprises metal powder.

12. A manufacturing process for an acoustic panel, comprising:
providing a panel comprising a first skin and a plurality of core walls attached to a second side of the first skin; and
perforating the first skin using a laser system, the perforating comprising
beginning formation of a first perforation in the first skin using the laser system;
operating a sensor to sense optical emissions generated during the formation of the first perforation; and
performing a first operation based on an output of the sensor to determine whether to continue the formation of the first perforation or terminate the formation of the first perforation;
wherein the first operation comprises sensing the output of the sensor to detect that a laser is striking an adhesive bead formed between and attaching together the first skin and one of the core walls and then in response terminating the formation of the first perforation in the first skin; and
wherein the adhesive bead is doped with one or more fillers that produce a plasma when struck by the laser beam.

13. The manufacturing process of claim 12, wherein the first skin comprises a fiber reinforced polymer.

14. The manufacturing process of claim 12, wherein the core walls comprise metal.

15. The manufacturing process of claim 12, wherein the adhesive bead comprises polymeric adhesive doped with the one or more fillers.

16. The manufacturing process of claim 15, wherein the one or more fillers comprises metal powder.

17. A manufacturing process, comprising:
providing a panel comprising a first skin and a core bonded to the first skin by bonding material doped with one or more fillers that produce plasma when struck by a laser beam, wherein the panel is configured with a plurality of cavities extending through the core to the first skin;
partially forming a first perforation in the first skin using a laser beam;
operating a sensor to sense optical emissions produced during the partial forming of the first perforation, wherein the optical emissions comprises the plasma; and
determining, based on an output of the sensor, whether to
continue formation of the first perforation in the first skin; or
terminate formation of the first perforation in the first skin.

18. The manufacturing process of claim 17, wherein the determining comprises determining to terminate the formation of the first perforation in the first skin where the output is indicative of the plasma.

19. The manufacturing process of claim 17, wherein the structural adhesive bonding material comprises polymeric adhesive doped with the one or more fillers.

20. The manufacturing process of claim 17, wherein the one or more fillers comprises metal powder.

* * * * *